Aug. 30, 1949.　　　　B. M. MARKS　　　　2,480,749
PROCESS FOR PREPARING CAST SYNTHETIC RESIN
HAVING INTEGRAL PATTERNED EFFECTS
Filed Aug. 27, 1947

INVENTOR.
Barnard M. Marks
BY
*J. M. [signature]*
ATTORNEY

UNITED STATES PATENT OFFICE 2,480,749

PROCESS FOR PREPARING CAST SYNTHETIC RESIN HAVING INTEGRAL PATTERNED EFFECTS

Barnard M. Marks, Newark, N. J., assignor to E. I. du Pont de Nemours & Company, Wilmington, Del., a corporation of Delaware Application August 27, 1947, Serial No. 770,887

14 Claims. (Cl. 18—58)

This invention relates to cast synthetic resin and, more particularly, to the preparation of such resin in the form of sheets and other shapes having integral patterned effects.

The term "integral patterned effects" is used herein as a generic term to cover the patterns forming an integral feature of the body and substance of a material through the orientation and/or distribution of effect materials such as pigments, lamellae, spangles, and the like, according to a predetermined arrangement, as opposed to effects dependent merely upon the character or treatment of the surface of the body.

The term "integral sheen" is used herein as a generic term to cover the several recognized varieties of sheen forming an integral feature of the body and substance of a material, as opposed to effects dependent upon the character or treatment of its surface, this integral sheen being due in its effect to a more or less ordered and systematic orientation, within the material, of lamellae (flat plates, crystals, and the like) of substances capable of reflecting light. As regards appearance, the term thus includes the various types of sheen and character of sheen commonly designated, in the plastics industry, by the terms pearly, nacreous, silky, metallic, chatoyant, and pearlescent.

Various substances, characterized in common by their occurrence in the form of light-reflecting lamellae, have been widely used for the purpose of imparting integral sheen to various transparent or substantially transparent plastics, such as cellulose ester and resin plastics. Such substances, including the so-called pearl essence obtained from fish scales, various inorganic and organic substitutes therefore, and metal bronzing powders, are well known in the art, as are also various methods whereby these lamellae may be brought into systematic orientation so as to yield certain desired visual effects. It is well recognized that to obtain a sheen effect the light-reflecting lamellae must be positioned or oriented so that a large percentage of them lie with their broad faces parallel to each other and substantially parallel to the surface of the plastic which is to have the appearance of sheen.

For years cellulose nitrate stock having integral patterned effects has been used in the manufacture of fountain pens, pencils, and the like. Such stock is obtained by various casting, extruding, and layup techniques disclosed in numerous patents. More recently, synthetic resins having integral sheen have been obtained by the incorporation of light-reflecting lamellae in polymerizable liquid organic compounds and subjecting same to polymerization conditions in a manner that causes orientation of the light-reflecting lamellae. For example, rods and tubes of cast synthetic resin having integral sheen may be prepared by progressive polymerization along the longitudinal axis of a rod mold (Fields et al. U. S. Patent 2,168,331) or by centrifugal casting in a cylindrical mold (Clewell et al. U. S. Patent 2,265,226) of such light-reflecting lamellae-containing polymerizable compounds. These procedures are primarily adapted to give a uniform integral sheen without any patterned effect at all. By certain variations the uniformity of the integral sheen may be interrupted so as to get a patterned effect of sorts but these procedures are not adapted for the production of cast resins having a definite predetermined patterned effect.

The production of cast synthetic resins having integral sheen has involved quite distinct problems from the production of cellulose nitrate plastics having integral sheen and heretofore no method has been known for directly casting a sheet having integral sheen from a polymerizable liquid organic compound. Further, no feasible method for producing predetermined integral patterned effects in synthetic resin sheets or bodies of other shapes, such patterns resulting from systematic distribution and/or orientation of light-reflecting lamellae, pigments, or other effect materials, has been known heretofore although a wide variety of patterns are obtainable in the older cellulose nitrate plastics art by the use of laborious and time-consuming layups.

An object of the present invention is to provide a new and economical process of producing cast synthetic resin having integral patterned effects. A more particular object is to provide a process for producing cast synthetic resin sheets having integral patterned effects, with or without integral sheen. A further object is to provide a process of producing predetermined patterns in cast synthetic resins, such patterns resulting from the orientation and/or distribution of effect materials. Other objects will be apparent from the description of the invention given hereinafter.

The above objects are accomplished according to the present invention by mixing and suspending an effect material in a polymerizable liquid organic compound adapted to give a polymer solid at ordinary temperatures, introducing the resulting mixture into a mold capable of transmitting actinic energy to the contents thereof, subjecting the mold to a source of actinic energy to induce polymerization of the mold contents and simultaneously controlling the transmission of the actinic energy so that areas of the polymerizing body in the mold receive more energy than do adjacent areas until a pattern appears in the polymerizing body, and thereafter subjecting the polymerizing body to polymerization conditions until polymerization thereof is substantially complete.

In a preferred and more specific form, the invention is carried out by adding photopolymerization catalyst to a mixture of light-reflecting lamellae and a polymerizable liquid organic compound, introducing the mixture into a mold such as the cells for casting sheets disclosed in Rohm et al. U. S. Patent 2,154,639, these cells usually being composed of two glass plates separated by a compressible gasket, adhering strips of paper or other material relatively opaque to light on one or both plates in any desired pattern, and subjecting one or both sides of the cell to an appropriate source of light until the desired pattern appears in the polymerizing body, after which polymerization is completed by thermal means.

The present invention resides to an important degree in the discovery of a most remarkable phenomenon, namely, that if actinic energy is transmitted in different degree to areas of a body of a polymerizable liquid organic compound having an effect material suspended therein, a visible pattern conforming to those areas will develop in the polymerizing mass. Further, it has been found that the first visible pattern developed conforms substantially exactly to those areas whereas, if exposure to the actinic energy is continued, this first pattern becomes gradually modified to a certain extent. Still further, it has been found that if the exposure to actinic energy is terminated at any time after the pattern becomes visible and the polymerization is then completed by thermal energy, the pattern will be permanently fixed substantially exactly as it appeared when the exposure to actinic energy was terminated.

From the above it will be seen the duration of exposure to actinic energy affects the pattern produced to an appreciable extent. If substantially the exact pattern of the masked paper or other means used to cut off the actinic energy is desired, then the exposure to actinic energy is terminated as soon as a pattern develops in the polymerizing mass and the polymerization completed by use of thermal energy. On the other hand, the exposure to actinic energy may be continued until a desired modification of the design develops and then the exposure terminated at this intermediate point and polymerization completed by thermal energy. Or exposure to actinic energy may be continued until polymerization is complete to obtain the maximum modification of the pattern formed by masking paper or the like. In any event, any particular pattern may be duplicated by using the same conditions and the same period of exposure to actinic energy.

The invention further resides in the discovery that not only is a patterned effect obtainable as above but, if light-reflecting lamellae are used as the effect material, there also occurs a substantial orientation of these lamellae parallel to the face of the body of polymer. That is, the cast resin has integral sheen as well as integral patterned effect. This is immediately evident from the brilliant sheen possessed by the cast body formed. This integral sheen is broken up by distinct lines related to the design of the masking paper or the like, thus permitting the reproduction of definite patterns in the cast body, a result which only has been obtained heretofore by the tedious and mechanical layup technique of the cellulose nitrate art.

In order to maintain a uniform dispersion of the effect materials, the polymerizable liquid organic compound should have a viscosity within the range of 5 to 50 poises, and, preferably, about 15 poises. In syrups having viscosities lower than 5 poises, there is a tendency for the larger particles of effect materials to settle out and, consequently, produce a pattern on only one side of the sheet or body being cast. However, syrup of such viscosities can be used when such an effect is desired. Furthermore, syrup with viscosities as low as 1 poise may be used satisfactorily with certain effect materials such as pigments and other materials of fine particle size where the problem of sedimentation is not encountered to any extent.

Perhaps the greatest value of the present invention resides in its application to the casting of sheets having integral sheen as well as integral patterned effects since no method of casting such sheets directly was known heretofore. However, the ability to reproduce patterns and obtain patterned effects never attainable heretofore is another outstanding advantage of the invention which makes the invention of great value as applied to the casting of objects of any shape regardless of whether an integral sheen effect is sought or not.

The manner of carrying out the invention will be more particularly described with reference to the accompanying drawing wherein.

Figure 1:
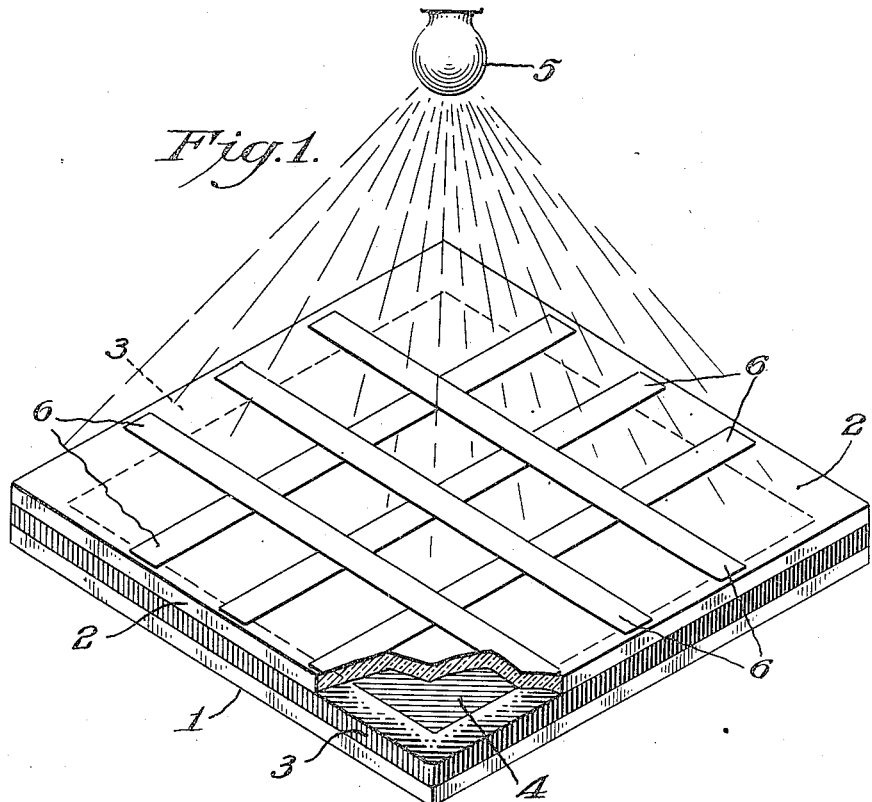
Fig. 1 is a perspective view, more or less diagrammatic, of an apparatus for carrying out the present invention.

Referring to Fig. 1, there is shown in horizontal position a conventional cell assembly for the casting of sheets. This cell is composed of glass plates 1 and 2 separated by the compressible gasket 3. Disposed in the cell is the polymerizable liquid organic compound 4 containing suspended light-reflecting lamellae and a light-activated polymerization catalyst. It will be appreciated by those skilled in the art that the lamellae are not oriented at this stage and because the broad faces of the lamellae are disposed at random, there is no sheen effect at all. It is only by the orientation of the lamellae so that a great majority in any particular area face parallel to the surface of the casting that a sheen effect is attainable.

A light source is designated by the reference numeral 5, such source being an emitter of ultraviolet, visible, or infrared light or a combination of these. Pasted on the plate 2 are a series of strips 6 of paper in the design of a square grid. Any type of paper or other material may be used, providing it is more or less opaque to the type of light which is to be used for inducing polymerization of the contents of the cell.

Polymerization of the contents of the cell is effected by energizing the light source 5 until a desired pattern appears. A short exposure to light will substantially reproduce the masking pattern, while longer exposures will produce modified patterns. The time at which the desired pattern is set, can be noted by observation. All other conditions being equal (i. e. viscosity of the resin, concentration of the effect material and intensity and wave length of the light source) the desired pattern can be reproduced by using the same exposure time. After the period of exposure to light, the polymerization is completed by thermal means. Complete polymerization, however, may be carried out by long exposure to actinic energy. When it is desirable to obtain a smooth surface on the sheeting it is recommended that the polymerization be completed before the sheet is stripped from the cell.

Figure 2:
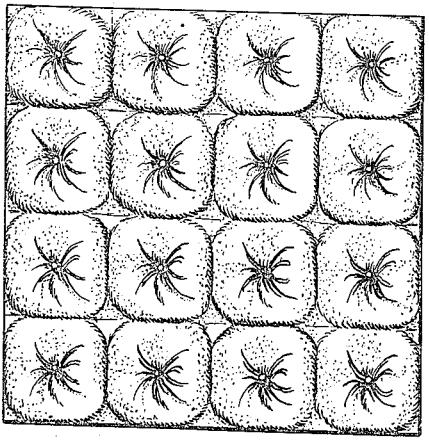
Fig. 2 is an elevation of the face of a square section of cast sheet made by the apparatus shown in Fig. 1.

As shown in Fig. 2, the cast sheet has integral sheen over its entire surface but, nevertheless, the integral sheen is broken up into distinct areas with lines of demarcation following the strips of paper placed on the plate 2. Within each area the integral sheen is not flat but gives a visual impression of considerable depth, somewhat as if a series of cushions of some pearlescent substance had been imbedded in the sheet.

Figure 3:
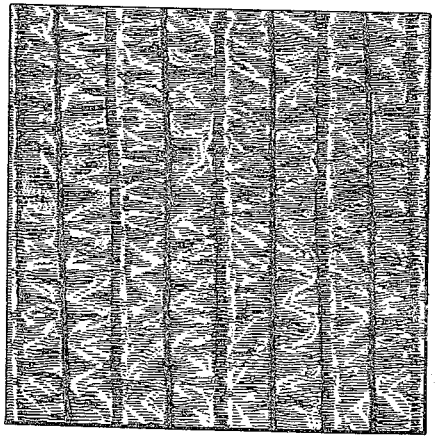
Fig. 3 is an elevation of the face of a square section of cast sheet made by using a modification of the apparatus of Fig. 1.

In Fig. 3 the surface shown is that which results from pasting a series of parallel opaque paper strips on the plate 2 with the cross strips omitted. The pattern in this instance faithfully follows the pattern predetermined by the parallel strips on the plate 2 and the areas are marked quite definitely. Although the surface of the sheet is a perfect plane, the orientation of the lamellae gives the visual impression of waves or billows of integral sheen, i. e., again there is the visual impression of considerable depth.

Since the pattern placed on plate 2 is reproduced in a cast sheet of polymer, an infinite number of designs are possible. There appears to be no limit to the width of the masking areas which can be used, providing certain areas of the mold contents receive more energy than do adjacent areas. The patterns reproduced in the cast sheets are by no means limited to geometric patterns as any predetermined random pattern may be reproduced in the sheets.

It is preferred to have the pattern which cuts down or cuts off the actinic energy used to induce polymerization, as close to the polymerizing mass as possible and, hence, adhering strips on the mold itself or painting directly on the mold is most expedient, but a pattern may be provided in a separate sheet and laid on the plate of the cell.

The invention is applicable to castings in general and in preparing rods and various other shapes it frequently is desirable to paste strips entirely around the mold or, alternatively, wrap a sheet containing the pattern around the mold, and have the light or heat energy impinge upon the mold from all directions. Moreover, in preparing sheets, a pattern may be applied to both plates of the cell and light furnished on both sides of the cell; obviously in such case, particularly where different patterns are used on the two sides and the sheet is relatively thin, each pattern will influence the relative rate of polymerization in the various areas of the sheet and cause to some extent a modification of the patterns which form on the two sides of the cast sheet.

The following examples wherein all proportions are given by weight unless otherwise specified, illustrate specific embodiments of the present invention.

*Example I*

Monomeric methyl methacrylate was maintained at a temperature of 80° C. for about three hours to obtain a syrup of polymerized methyl methacrylate dissolved in monomeric methyl methacrylate. This syrup at room temperature had a viscosity of about 30 poises. To this syrup was added, based on the weight of syrup, 0.1% benzoyl peroxide and 0.2% benzoin, as polymerization catalysts, and 0.3% of a paste of pearl essence from fish scales dispersed in cellulose nitrate solution, this preparation being known commercially as Paispearl paste. After thorough mixing, this syrup was poured into a conventional sheet casting cell composed of two plates of glass one-quarter of an inch thick and an interposed compressible gasket adapted to give a finished cast sheet one-quarter of an inch in thickness. One of the glass plates had adhered to its outer surface a series of parallel regenerated cellulose strips one-quarter of an inch wide and spaced one-half inch apart. This regenerated cellulose stripping, commercial Scotch tape, was found to have a high opacity to the transmission of ultraviolet light rays.

The filled cell was placed in horizontal position with the plate to which the strips had been adhered, uppermost and the cell exposed at room temperature to irradiation from a mercury arc at a distance of 15 inches above the cell for four hours. At the end of this time the polymerization was complete and a solid resin sheet was formed having integral sheen entirely covering both of its faces. The integral sheen was in definite parallel bands as illustrated in Fig. 3 of the drawing with clear lines of demarcation hardly thicker than a pencil line between the bands. Within the bands the integral sheen was waved or billowed and gave an exceedingly attractive and unique appearance of considerable depth.

*Example II*

Monomeric methyl methacrylate containing 0.002% of benzoyl peroxide as a polymerization catalyst was heated at 70° C. until it thickened to a syrup having at room temperature a viscosity about 30 poises. To this syrup was added 0.2% benzoin and 0.4% of pearl essence paste. The syrup was then poured into a cell as described in Example I but one plate of the cell had adhered to its outer surface a series of parallel strips of kraft paper one-quarter of an inch in width and spaced one-half inch apart and a second similar series of strips running at right angles to the first series.

The filled cell with the plate to which the strips had been attached, uppermost was placed in horizontal position and exposed to direct sunlight for ten hours at the end of which time a cast sheet of solid polymer resulted. In this instance the lamellae were oriented in a design such as illustrated in Fig. 2 of the drawing, each square of integral sheen being sharply delineated.

*Example III*

Monomeric methyl methacrylate containing 0.002% benzoyl peroxide as a polymerization catalyst, was heated at 70° C. until it thickened to a viscosity of about 1.5 poises. To this syrup was added, based on the weight of syrup, 0.1% benzoin and 0.007% of alpha, alpha' azobis (alpha, gamma, dimethylvaleronitrile), as polymerization catalysts, and 0.2% of zinc oxide pigment. After thorough mixing the syrup was then poured into a cell (as described in Example I) adapted to give a finished sheet one-eighth of an inch in thickness but one plate had adhered to its outer surface a cardboard pattern composed of one-half inch diameter circular holes with three-quarters of an inch between centers. The cell was then placed in horizontal position and exposed to a bank of lamps composed of four BL-360 lights for a period of two hours. (BL-360 fluorescent lights manufactured by the General Electric Company produce "black light" of maximum intensity at approximately 3600 Angstrom wave length). After exposure to light, the polymerization was completed in an air oven at 118° F. in eight hours. The lamps were maintained at a distance of four and one-half inches away from the surface of the cell. A pattern consisting of adjacent diamond-shaped figures was formed. The boundaries of the figures were less opaque to light than the enclosed areas.

*Example IV*

A syrup of methyl methacrylate was prepared by heating the monomer with 0.002% of benzoyl peroxide at 70° C. until a viscosity of about 17 poises was obtained. To this syrup were added the same catalysts as used in Example III, along with 4% of cellophane spangles. The spangles consisted of small particles of gold colored cellophane approximately one thirty second of an inch square by 0.001 inch in thickness. After thorough mixing the syrup was poured into a type of cell (described in Example I) and adapted to give a sheet one-quarter of an inch in thickness. The masking pattern used was composed of cardboard into which one-half inch squares were stamped. The borders between the square openings were three-sixteenth of an inch in thickness. The masked side of the cell was then exposed to irradiation from a quartz mercury arc lamp for a period of one hour. The lamp was fixed at a distance of eighteen inches away from the surface of the cell. The polymerization was then completed in an air oven at 118° F. in seven hours. The pattern formed in the cast sheet was composed of a checkered arrangement of translucent squares with opaque borders. The pattern produced conformed to the pattern cut in the cardboard.

*Example V*

An 8 poise syrup of methyl methacrylate was prepared according to the method in Example IV. To a portion of this syrup was added an equal portion of polyethylene glycol 200 dimethacrylate, a dimethacrylate ester of a mixture of various glycols having the formula $HO(CH_2CH_2O)_nH$ wherein $n$ is an integer (preferably from 1 to 20), said mixture of glycols having an average molecular weight of approximately 200. The resulting mixture produced a syrup with a viscosity of 1.5 poises. To this syrup were added the same catalysts in the same proportions as in Example III together with 0.6% of pearl essence paste and 2.5% of concentrated purple dye. The syrup was poured into a cell (as described in Example I) adapted to give a finished sheet one-quarter of an inch in thickness. One side of the cell was masked with straight parallel strips of $\frac{1}{16}$ inch tape placed one-half inch apart. The cell was then placed in a horizontal position and exposed to the irradiation from a bank of four BL-360 lights which was maintained at a distance of four and one-half inches above the surface of the cell. The time of exposure to light was two hours and the polymerization was completed in an air oven at 118° F. in six hours. The pattern formed in the cast sheet consisted of parallel strips of integral sheen being sharply delineated by opaque boundary lines.

*Example VI*

A syrup of methyl methacrylate with a viscosity of 20 poises was prepared according to the method in Example IV. To this syrup was added the same concentrations of catalyst, pearl essence paste, and purple dye as given in Example V. This syrup was then divided into four equal portions and these portions were poured into four identical cells (of the type described in Example I) adapted to give finished sheets one-quarter of an inch in thickness. The same masking pattern, ordinary cardboard, which contained one-half inch diameter circular holes with three-quarters of an inch between centers, was used to mask one side of each cell. The cells were placed in a horizontal position and were exposed in turn to the irradiation from a quartz mercury arc lamp fixed at a distance of seven inches from the masked surface of the cells. Each cell was exposed for a different period of time, namely, 2, 5, 10 and 15 minutes respectively, and all other conditions were equal. After each cell was exposed to actinic energy the polymerization was completed in an air oven at 118° F. in six hours. The pattern formed on the sheets which were exposed to actinic energy for 2 and 5 minutes was substantially a reproduction of the original masking pattern. The patterns formed in the sheets given a longer exposure to actinic energy consisted of adjacent diamond-shaped figures. This experiment illustrates that by shorter exposures to light the masking pattern is more accurately reproduced than with longer exposures.

*Example VII*

Methyl methacrylate syrup with a viscosity of 22 poises was prepared according to the method of Example III. The same concentrations of catalyst, pearl essence paste, and purple dye as used in Example V were added to the syrup. The mixture was poured into a cell adapted to give a finished sheet one-quarter of an inch in thickness which was masked on both sides with patterns which were mirror-images. The pattern consisted of parallel strips of ordinary cardboard $\frac{3}{16}$ of an inch wide and one-half inch apart. The cell was then placed between two banks of two BL—360 lamps each fixed at a distance of four and one-half inches from the surfaces of the cell. The cell was then irradiated from both sides for a period of two hours, and the polymerization was completed in an air oven at 118° F. in eight hours. The pattern formed on each side of the cast sheeting was composed of parallel sections with integral sheen separated by sharp opaque boundary lines. The patterns were similar but not coincident owing to the fact that the lights were relatively close to the surfaces of the cell and that a large amount of light entered the cell at angles other than 90°.

*Example VIII*

Methyl methacrylate syrup with a viscosity of 17 poises was prepared according to the method given in Example III. The same concentrations of catalysts, pearl essence paste, and purple dye as used in Example V were mixed with the syrup. The mixture was then poured into a cell (as described in Example I) adapted to give a finished sheet one-quarter of an inch in thickness. On the outer surface of one of the glass plates a number of letters were scribed with a china marking pencil ("Blaisdell" China Marking Pencil #168-T). The letters were one-eighth of an inch in width and about two inches high. The scribed half of the cell was then irradiated with a quartz mercury vapor lamp. The lamp was fixed at a distance of 17 inches from the surface of the cell. Polymerization was completed in an air oven at 118° F. in eight hours. An exact reproduction of the scribed initials was produced in the cast sheet.

It will be understood that the above examples are merely illustrative and that the invention broadly comprises mixing and suspending an effect material in a polymerizable liquid organic compound adapted to give a solid polymer at ordinary temperatures, introducing the resulting mixture into a mold capable of transmitting actinic energy to the contents thereof, subjecting the mold to a source of actinic energy in the manner hereinbefore described.

It will be apparent to those skilled in the art that neither the specific type of mold, always providing its walls permit transmission of actinic energy, nor the specific source of actinic energy is limited in this invention. It should be noted that the more nearly parallel the light rays falling on the mold surface are, the more faithful is the reproduction of the pattern in question; also, the closer the pattern is to the body of polymerizable liquid organic compound, the more faithful is the reproduction of the pattern. Where thermal energy is employed to complete the polymerization, heated gases may be used as well as heated liquids. The temperature at which the polymerization is carried out, may vary from room temperature up to 130° C. depending upon the various factors well known to those skilled in the art of casting polymerizable organic compounds. The selection of an optimum temperature under any given conditions will be based on the usual considerations of the prior art and will not be appreciably influenced by any specific considerations relating to the instant invention.

The invention is manifestly applicable broadly to liquid organic compounds that may be polymerized to polymers solid at ordinary temperatures. Obviously, the invention is of greater value as applied to those compounds which give solid polymers of the most useful properties and, normally, the invention will be applied to organic compounds which give rigid castings.

A large class of liquid organic compounds adapted for use in this invention are the ethylenically unsaturated compounds which are polymerizable by the action of light or heat, either alone or in admixture with one or more similar compounds. Among such compounds are the amides, esters and nitriles of acrylic, chloroacrylic and alkacrylic acids, e. g., methacrylamide, methyl acrylate, methyl chloroacrylate, methyl methacrylate, ethyl methacrylate, butyl methacrylate, ethoxyethyl methacrylate, glycol dimethacrylates, methyl ethacrylate, ethyl ethacrylate, acrylonitrile, methacrylonitrile; other vinyl and vinylidene compounds, e. g., vinyl acetate, vinyl chloride, vinylidene chloride, vinyl ethers, styrene, methyl styrene, allyl chloride and dimethyl itaconate. Numerous other organic compounds possessing the requisite properties herein discussed will readily occur to those skilled in the art.

It is an essential part of this invention that effect materials be mixed with the polymerizable liquid organic compound, and such materials included under this classification are well known in the art. For example, commonly used light-reflecting lamellae which include the well known pearl essence obtained from fish scales, mercurous chloride, basic lead carbonate "pearl" pigment, lead iodide in the form of light-reflecting lamellae, and numerous metal bronzing powders such as aluminum-bronze "pearl," "gold" bronze, copper-aluminum alloy bronzes and the like may be used as the effect materials. On the other hand patterned effects without integral sheen may be obtained with such materials as cellophane spangles (see Example IV) and various types of pigments commonly employed to produce colored and translucent cast sheeting such as titanium dioxide, zinc oxide, cadmium red, cadmium yellow, monastral blue, cosmic black, red lake etc. The proportion of effect materials used in the casting composition is entirely optional and dependent upon the particular visual result desired. Normally, from .005% to 20%, by weight of the polymerizable liquid compound, will be used although manifestly, a proportion outside this range may be used if it gives the desired effect.

Except with polymerizable compounds which are exceedingly readily polymerized, the use of a polymerization catalyst is advisable. When the two-stage process is employed, it is recommended that a combination of a thermal and photopolymerization catalyst be used. Various photopolymerization catalysts are disclosed in Agre U. S. Patents 2,367,660 and 2,367,661 and Howk et al. U. S. Patent 2,413,973, including the proportions in which they are conventionally used. Suitable photopolymerization catalysts include benzoin and similar vicinal ketaldonyl and acyloin compounds as disclosed in the above Agre patents and various azo-type catalysts such as alpha, alpha'-azodiisobutyronitrile, as disclosed in Salisbury U. S. application Serial No. 655,013. These various catalysts will be used in such catalytic amounts as they would be in any ordinary casting operation, the present invention not requiring any specific variation from such proportions. With castings that are to be completely polymerized by light, a thermal polymerization catalyst normally would not be added to the polymerizable liquid.

Where the polymerization is to be completed by heat, it is preferred to include in the polymerizable liquid one of the conventional thermal polymerization catalysts such as benzoyl peroxide, lauroyl peroxide, acetyl benzoyl peroxide, diacetyl peroxide, tertiary butyl perbenzoate, p-chloro benzoyl peroxide, and such azo catalysts as alpha, alpha'-azodiisobutyronitrile. When the two stage process is used, it has been discovered that a mixture of a thermally activated catalyst and a photopolymerization catalyst gives more rapid polymerization rates. For example, when a mixture of benzoin and alpha, alpha'-azodiisobutyronitrile is used, the curing cycle is decreased appreciably below that required when only benzoin is used (when polymerization is effected by actinic energy alone) or when only the azo catalyst is used (when polymerization is effected by thermal energy alone). This is true not only in the production of cast resin sheeting having integral pattern effects but also in the production of clear transparent sheeting.

Various dyestuffs, plasticizers, lubricants, and other modifiers may be incorporated with the polymerizable liquid organic compounds to obtain certain desired characteristics in the finished product, according to well-known practices in the art. It is ordinarily preferable to start with the polymerizable liquid organic compound in partially polymerized condition, i. e., as a more or less viscous syrup rather than with straight organic liquid. The use of syrup shortens the duration of the process and also reduces any tendency of the effect materials to settle out under the influence of gravity as described hereinbefore.

An outstanding advantage of the present invention is that it provides a practical method of obtaining synthetic resin sheets or other bodies, with or without integral sheen, having integral, predetermined pattern effects, a result heretofore considered impossible to obtain with these polymerizable liquid organic compounds and only obtainable even in the cellulose nitrate art by a series of costly mechanical operations. A further advantage is that the invention provides a simple, economical, and effective way of directly casting synthetic resin sheets having integral sheen. A further advantage of the invention is that it provides a method of obtaining synthetic resin sheets and the like having entirely novel integral sheen effects of great attractiveness.

As many apparently widely different embodiments of this invention may be made without departing from the spirit and scope thereof, it is to be understood that the invention is not limited to the specific embodiments thereof except as defined in the appended claims.

I claim:

1. Process of preparing cast synthetic resin having predetermined integral patterned effects which comprises mixing and suspending an effect material in a polymerizable liquid organic compound adapted to give a polymer solid at ordinary temperatures, introducing the resulting mixture into a mold capable of transmitting actinic energy to the contents thereof, applying actinic energy to said mold to induce polymerization of said mold contents and simultaneously controlling the transmision of said actinic energy so that selected areas of the polymerizing body in said mold receive more energy than do adjacent areas until a pattern resulting from arrangement of said effect material and conforming to the pattern defined by said selected areas, appears in said polymerizing body, and thereafter subjecting said polymerizing body to polymerization conditions until polymerization thereof is substantially complete.

2. Process of preparing cast synthetic resin having predetermined integral patterned effects which comprises mixing and suspending an effect material in a polymerizable liquid organic compound adapted to give a polymer solid at ordinary temperatures, introducing the resulting mixture into a mold capable of transmitting actinic energy to the contents thereof, applying actinic energy to said mold to induce polymerization of said mold contents and simultaneously controlling the transmission of said actinic energy so that selected areas of the polymerizing body in said mold receive more energy than do adjacent areas until a pattern resulting from arrangement of said effect material and conforming to the desired degree to the pattern defined by said selected areas, appears in said polymerizing body, and thereafter subjecting said polymerizing body to thermal energy until polymerization thereof is substantially complete.

3. Process of preparing cast synthetic resin sheets having predetermined integral patterned effects which comprises mixing and suspending an effect material in a polymerizable liquid organic compound adapted to give a polymer solid at ordinary temperatures, introducing the resulting mixture into a cell composed of two plates separated by a compressible gasket, at least one of said plates being capable of transmitting actinic energy to the contents of said cell, applying actinic energy to said cell to induce polymerization of said cell contents and simultaneously controlling the transmission of said actinic energy so that selected areas of the polymerizing body in said cell receive more energy than do adjacent areas until a pattern resulting from arrangement of said effect material and conforming to the pattern defined by said selected areas, appears in said polymerizing body, and thereafter subjecting said polymerizing body to polymerization conditions until polymerization thereof is substantially complete.

4. Process of preparing cast synthetic resin sheets having predetermined integral patterned effects which comprises mixing and suspending an effect material in a polymerizable liquid organic compound adapted to give a polymer solid at ordinary temperatures, introducing the resulting mixture into a cell composed of two plates separated by a compressible gasket, at least one of said plates being capable of transmitting actinic energy to the contents of said cell, applying actinic energy to said cell to induce polymerization of said cell contents and simultaneously controlling the transmission of said actinic energy so that selected areas of the polymerizing body in said cell receive more energy than do adjacent areas until a pattern resulting from arrangement of said effect material and conforming to the desired degree to the pattern defined by said selected areas, appears in said polymerizing body, and thereafter subjecting said polymerizing body to thermal energy until polymerization thereof is substantially complete.

5. Process of preparing cast synthetic resin sheets having predetermined integral patterned effects which comprises mixing and suspending an effect material in a polymerizable liquid organic compound adapted to give a polymer solid at ordinary temperatures, introducing the resulting mixture into a cell composed of two plates separated by a compressible gasket, at least one of said plates being capable of transmitting actinic energy to the contents of said cell and having selected areas thereof defining a pattern covered with material resistant to the transmission of actinic energy therethrough, applying actinic energy to at least said plate having said covered areas to induce polymerization of said cell contents until a pattern resulting from arrangement of said effect material and conforming to said pattern, appears in the polymerizing body in said cell, and thereafter subjecting said polymerizing body to polymerization conditions until polymerization thereof is substantially complete.

6. Process of preparing cast synthetic resin sheets having predetermined integral patterned effects which comprises mixing and suspending an effect material in a polymerizable liquid organic compound adapted to give a polymer solid at ordinary temperatures, introducing the resulting mixture into a cell composed of two plates separated by a compressible gasket, at least one of said plates being capable of transmitting actinic energy to the contents of said cell and having selected areas thereof defining a pattern covered with material resistant to the transmission of actinic energy therethrough, applying actinic energy to at least said plate having said covered areas to induce polymerization of said cell contents until a pattern resulting from arrangement of said effect material and conforming to the desired degree to said pattern, appears in the polymerizing body in said cell, and thereafter subjecting said polymerizing body to thermal energy until polymerization thereof is substantially complete.

7. Process set forth in claim 6 wherein said polymerizable liquid organic compound contains both a photopolymerization catalyst and a thermal polymerization catalyst.

8. Process set forth in claim 1 wherein said polymerizable liquid organic compound is methyl methacrylate.

9. Process of preparing cast synthetic resin having integral sheen in a predetermined pattern which comprises mixing and suspending light-reflecting lamellae in methyl methacrylate, introducing the resulting mixture into a mold capable of transmitting actinic energy to the contents thereof, applying actinic energy to said mold to induce polymerization of said mold contents and simultaneously controlling the transmission of said actinic energy so that selected areas of the polymerizing body in said mold receive more energy than do adjacent areas until a pattern resulting from arrangement of said light-reflecting lamellae and conforming to the pattern defined by said selected areas, appears in said polymerizing body, and thereafter subjecting said polymerizing body to polymerizing conditions until polymerization thereof is substantially complete.

10. Process of preparing cast synthetic resin having integral sheen in a predetermined pattern which comprises mixing and suspending light-reflecting lamellae in methyl methacrylate, introducing the resulting mixture into a mold capable of transmitting actinic energy to the contents thereof, applying actinic energy to said mold to induce polymerization of said mold contents and simultaneously controlling the transmission of said actinic energy so that selected areas of the energy than do adjacent areas until a pattern polymerizing body in said mold receive more resulting from arrangement of said light-reflecting lamellae and conforming to the desired degree to the pattern defined by said selected areas, appears in said polymerizing body, and thereafter subjecting said polymerizing body to thermal energy until polymerization thereof is substantially complete.

11. Process of preparing cast synthetic resin sheets having integral sheen in a predetermined pattern which comprises mixing and suspending light-reflecting lamellae in methyl methacrylate, introducing the resulting mixture into a cell composed of two plates separated by a compressible gasket, at least one of said plates being capable of transmitting actinic energy to the contents of said cell, applying actinic energy to said cell to induce polmerization of said cell contents and simultaneously controlling the transmission of said actinic energy so that selected areas of the polymerizing body in said cell receive more energy than do adjacent areas until a pattern resulting from arrangement of said light-reflecting lamellae and conforming to the desired degree to the pattern defined by said selected areas appears in said polymerizing body, and thereafter subjecting said polymerizing body to thermal energy until polymerization thereof is substantially complete.

12. Process of preparing cast synthetic resin sheets having integral sheen in a predetermined pattern which comprises mixing and suspending light-reflecting lamellae in methyl methacrylate, introducing the resulting mixture into a cell composed of two plates separated by a compressible gasket, at least one of said plates being capable of transmitting actinic energy to the contents of said cell and having selected areas thereof defining a pattern covered with material resistant to the transmission of actinic energy therethrough, applying actinic energy to at least said plate having said covered areas to induce polymerization of said cell contents until a pattern resulting from arrangement of said light-reflecting lamellae and conforming to said pattern, appears in the polymerizing body in said cell, and thereafter subjecting said polymerizing body to polymerization conditions until polymerization thereof is substantially complete.

13. Process of preparing cast synthetic resin sheets having integral sheen in a predetermined pattern which comprises mixing and suspending light-reflecting lamellae in methyl methacrylate, introducing the resulting mixture into a cell composed of two plates separated by a compressible gasket, at least one of said plates being capable of transmitting actinic energy to the contents of said cell and having selected areas thereof defining a pattern covered with material resistant to the transmission of actinic energy therethrough, applying actinic energy to at least said plate having said covered areas to induce polymerization of said cell contents, until a pattern resulting from arrangement of said light-reflecting lamellae and conforming to the desired degree to the pattern defined by said selected areas, appears in the polymerizing body in said cell, and thereafter subjecting said polymerizing body to thermal energy until polymerization thereof is substantially complete.

14. Process set forth in claim 13 wherein said methyl methacrylate contains both a photopolymerization catalyst and a thermal polymerization catalyst.

BARNARD M. MARKS.

REFERENCES CITED

The following references are of record in the file of this patent:

UNITED STATES PATENTS

| Number | Name | Date |
| --- | --- | --- |
| 1,831,323 | Root | Nov. 10, 1931 |
| 2,168,331 | Fields et al. | Aug. 8, 1939 |
| 2,250,958 | Kautter et al. | July 29, 1941 |

Certificate of Correction

Patent No. 2,480,749                                                August 30, 1949

BARNARD M. MARKS

It is hereby certified that errors appear in the printed specification of the above numbered patent requiring correction as follows:

Column 13, lines 44 and 45, strike out the words "energy than do adjacent areas until a pattern polymerizing body in said mold receive more" and insert instead *polymerizing body in said mold receive more energy than do adjacent areas until a pattern*;

and that the said Letters Patent should be read with these corrections therein that the same may conform to the record of the case in the Patent Office.

Signed and sealed this 3rd day of January, A. D. 1950.

[SEAL]

THOMAS F. MURPHY,
*Assistant Commissioner of Patents.*